United States Patent
Sugimoto et al.

(10) Patent No.: US 8,887,864 B2
(45) Date of Patent: Nov. 18, 2014

(54) SOUND ABSORPTION PANEL

(75) Inventors: Akio Sugimoto, Kobe (JP); Zenzo Yamaguchi, Kobe (JP); Ichiro Yamagiwa, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 13/993,024

(22) PCT Filed: Feb. 15, 2012

(86) PCT No.: PCT/JP2012/053560
§ 371 (c)(1),
(2), (4) Date: Jun. 10, 2013

(87) PCT Pub. No.: WO2012/111720
PCT Pub. Date: Aug. 23, 2012

(65) Prior Publication Data
US 2013/0264147 A1 Oct. 10, 2013

(30) Foreign Application Priority Data
Feb. 15, 2011 (JP) .................................. 2011-030307

(51) Int. Cl.
*E04B 1/82* (2006.01)

(52) U.S. Cl.
USPC ............ 181/293; 181/290; 181/292; 181/284

(58) Field of Classification Search
USPC ................................ 181/290, 284, 292, 293
See application file for complete search history.

(56) References Cited

U.S. PATENT DOCUMENTS

| 3,467,569 A * | 9/1969 | Weber et al. ............... 428/317.7 |
| 5,457,291 A * | 10/1995 | Richardson .................... 181/293 |
| 6,202,786 B1 * | 3/2001 | Pfaffelhuber et al. ........ 181/286 |
| 6,290,022 B1 * | 9/2001 | Wolf et al. .................... 181/292 |
| 6,698,543 B2 * | 3/2004 | Golterman .................... 181/291 |
| 6,966,402 B2 * | 11/2005 | Matias et al. ................. 181/290 |

(Continued)

FOREIGN PATENT DOCUMENTS

| JP | 04-111837 | 4/1992 |
| JP | 4-111837 U | 9/1992 |

(Continued)

OTHER PUBLICATIONS

International Search Report from the International Bureau in corresponding International Application No. PCT/JP2012/053560, mailed Apr. 3, 2012, 2 pages in English; Written Opinion from the International Searching Authority, mailed Apr. 3, 2012, 3 pages in English.

(Continued)

*Primary Examiner* — Forrest M Phillips
(74) *Attorney, Agent, or Firm* — Studebaker & Brackett PC

(57) ABSTRACT

Sound absorbency is imparted on a panel, which has increased strength and rigidity, by laminating a foam resin that is not originally permeable and does not absorb sound, and surface sheets that are not originally permeable and do not absorb sound. A sound absorption panel 1, obtained by laminating a foam resin 20 comprising closed cells and aluminum alloy sheets 10 (metal sheets), has a plurality of holes 30 formed therein, which penetrate the foam resin 20 and the aluminum alloy sheets 10 in the thickness direction. The holes 30 are formed by forcing a needle 40 (hole-forming means) through the foam resin 20 and the aluminum alloy sheets 10.

7 Claims, 6 Drawing Sheets

(56) References Cited

U.S. PATENT DOCUMENTS

| | | |
|---|---|---|
| 2007/0020447 A1 | 1/2007 | Yamaguchi et al. |
| 2008/0257641 A1 | 10/2008 | Tocchi et al. |
| 2009/0011218 A1 | 1/2009 | Sugawara et al. |
| 2012/0214886 A1 | 8/2012 | Sugawara et al. |
| 2013/0118831 A1* | 5/2013 | Kawai et al. .......... 181/290 |

FOREIGN PATENT DOCUMENTS

| | | |
|---|---|---|
| JP | 7-237274 A | 9/1995 |
| JP | 10-319970 A | 12/1998 |
| JP | 2002-524635 A | 8/2002 |
| JP | 2003-025362 A | 1/2003 |
| JP | 2003-295867 A | 10/2003 |
| JP | 2006-116671 A | 5/2006 |
| JP | 2008-537526 A | 9/2008 |
| JP | 2009-120060 A | 6/2009 |
| JP | 2009-145694 A | 7/2009 |
| JP | 2009-161170 A | 7/2009 |
| JP | 2010-051629 A | 3/2010 |
| WO | WO 00/15697 A1 | 3/2000 |
| WO | WO 2006-101142 A1 | 9/2006 |

OTHER PUBLICATIONS

Architectural Institute of Japan, "Acoustic Materials for Building Application," Architectural Institute of Japan, $1^{st}$ edition, Oct. 25, 1997, pp. 66-67.

* cited by examiner

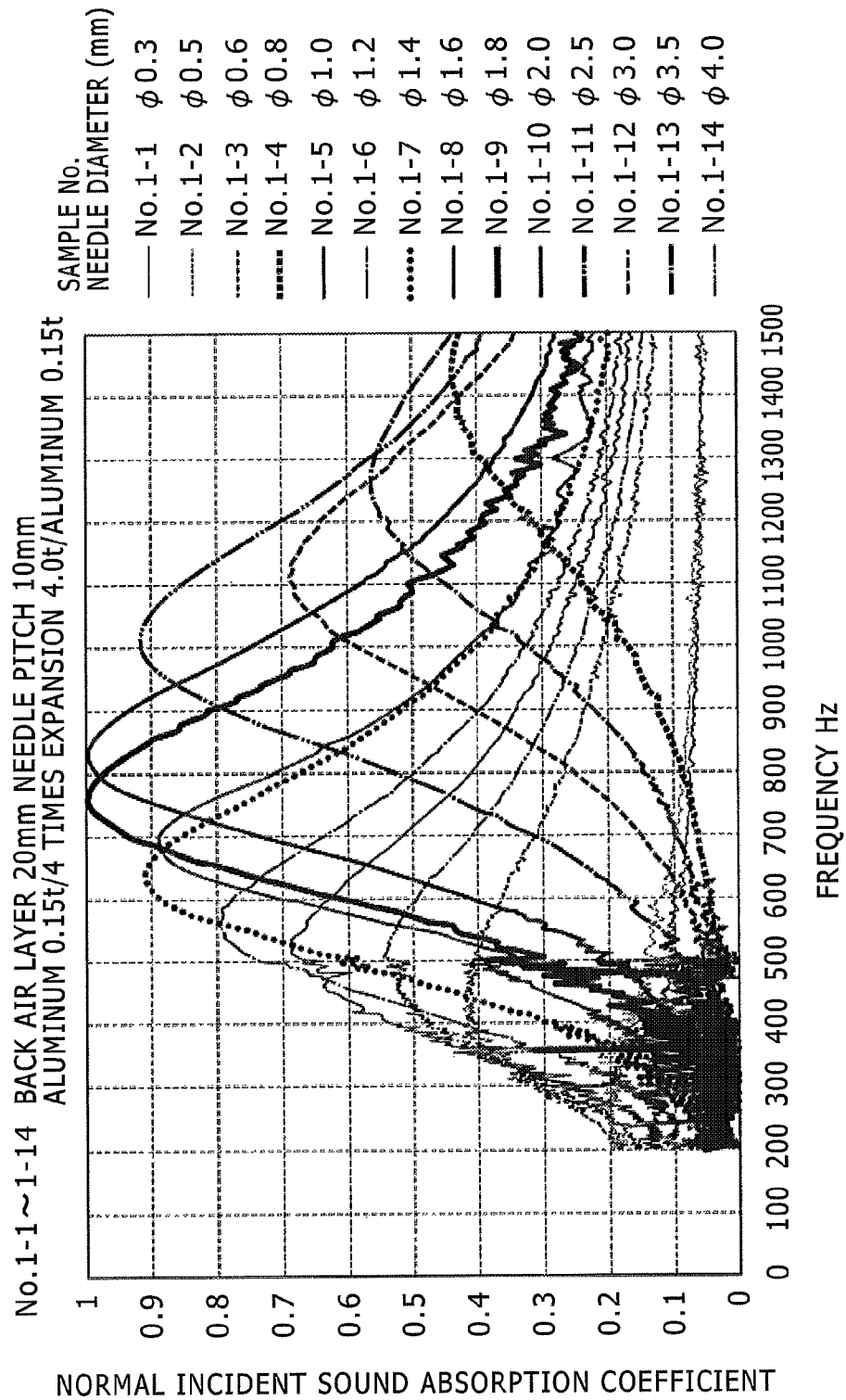

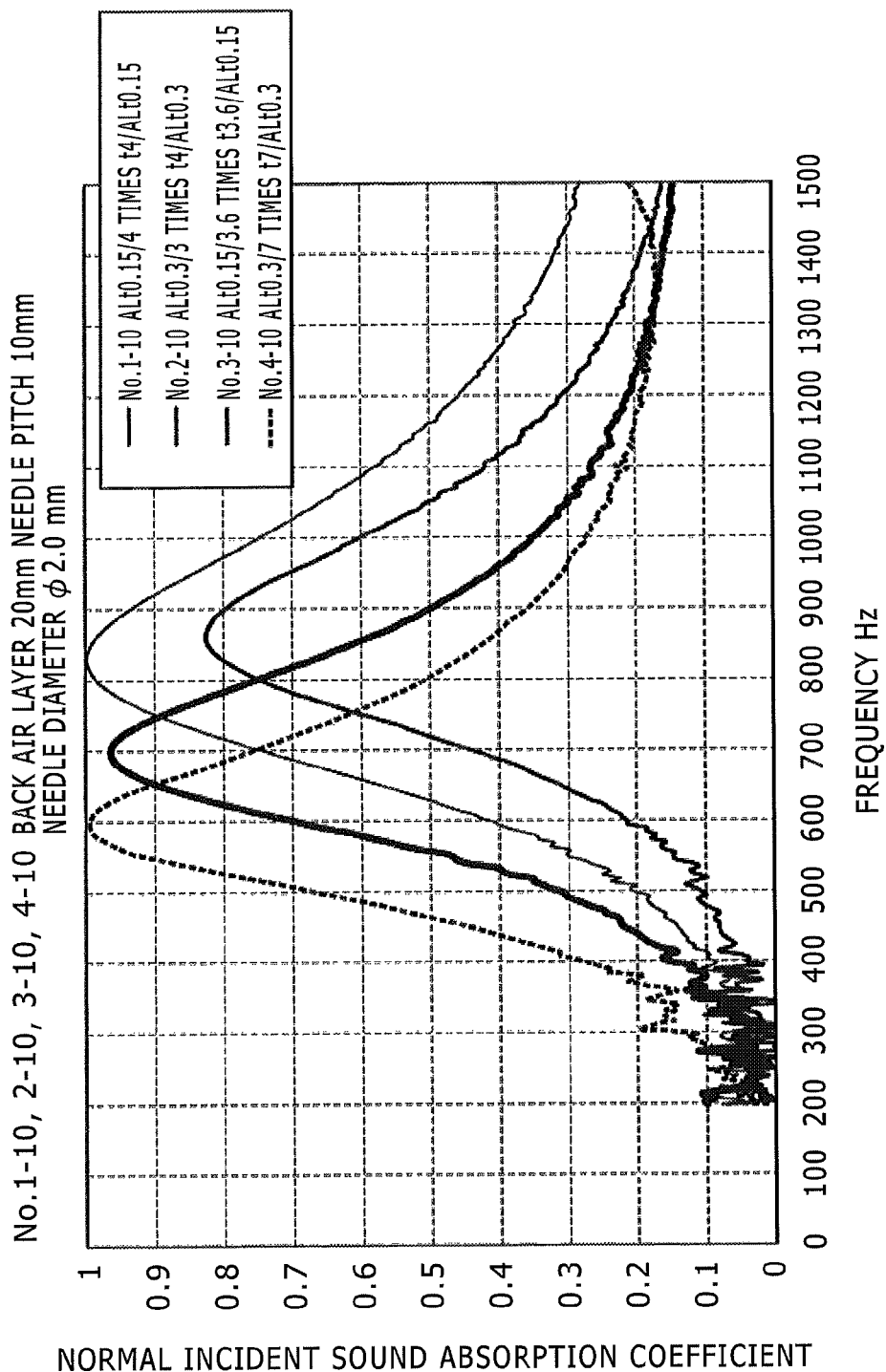

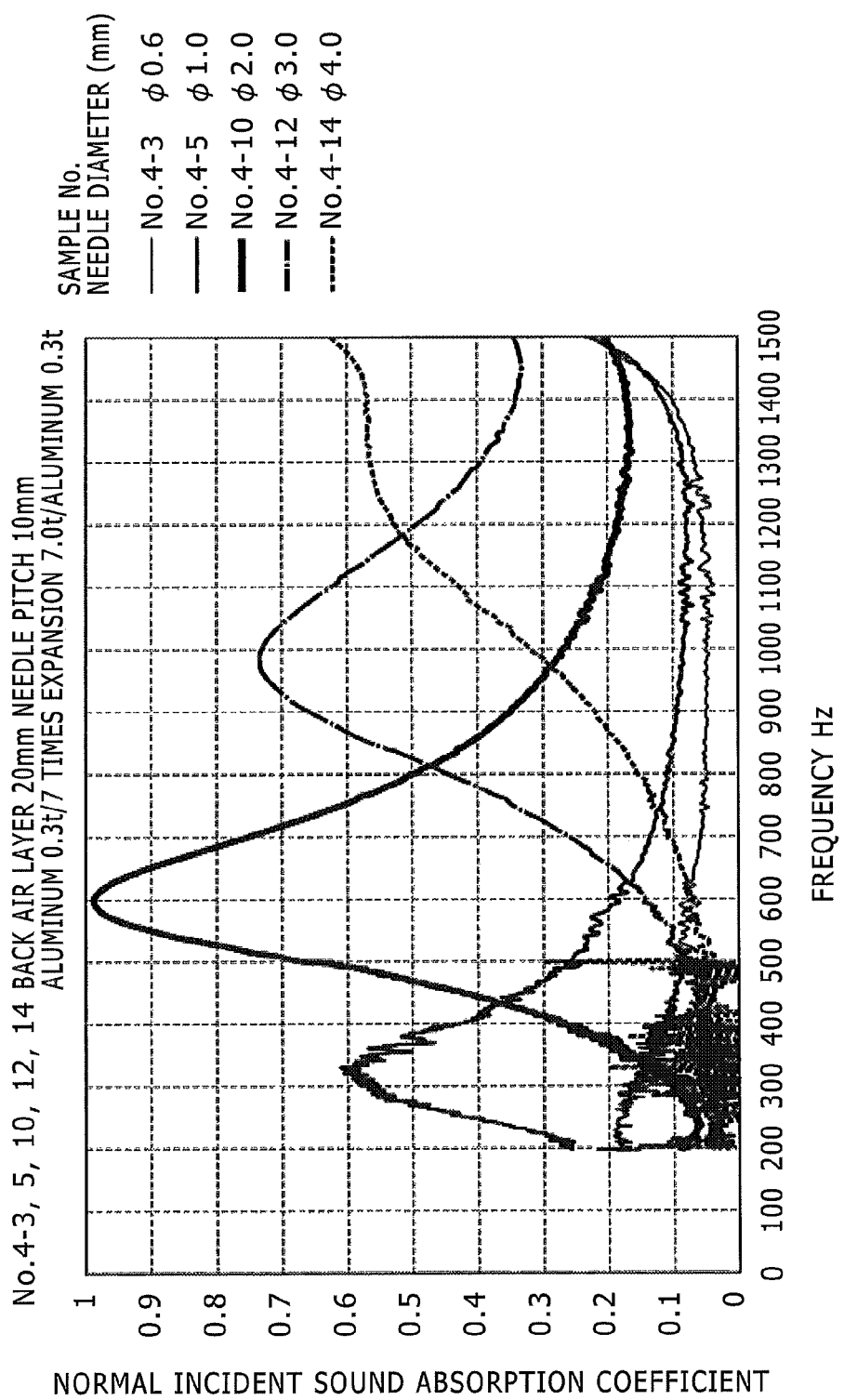

INFLUENCE OF BACK AIR LAYER ON SOUND ABSORBENCY
OF PERFORATED PLATE SOUND ABSORPTION STRUCTURE

SOUND ABSORPTION PANEL

TECHNICAL FIELD

The present invention relates to a sound absorption panel with sound absorbency.

BACKGROUND ART

Hitherto, various sound absorption materials are known. As the sound absorption material, there is known a material such as a foam resin with an open cell or an aggregate of fiber having air permeability and air passage resistance. For example, Patent Document 1 discloses an expanding body with an open cell structure.

Further, for example, pages 66 and 67 of Non-Patent Document 1 disclose a sound absorbency performance of a porous sound absorption material and a porous sound absorption structure as below. Furthermore, "FIG. 4.2.1(a)" and "FIG. 4.2.1(b)" correspond to FIGS. 6(a) and 6(b) of the application.

As one of material characteristics of the "porous sound absorption material", air permeability may be exemplified since a plurality of microscopic gaps or open cells illustrated in FIG. 4.2.1(a) exist in the material. When these constitute a sound absorption mechanism, sound energy is mainly converted into thermal energy due to the viscous friction while the sound enters the porous sound absorption material and penetrates the microscopic gaps or cells, and hence the sound energy is attenuated. Furthermore, even in the same expanding agent, the material having closed cells illustrated in FIG. 4.2.1(b) is a porous material, but is not included in the porous sound absorption material.

Further, in order to adjust a frequency with a maximal sound absorption coefficient or to obtain a protection from an exhaust gas or an UV ray, there is known a technique for providing a member without air permeability on a surface of a material with air permeability. For example, Patent Document 2 discloses a technique in which a resin sheet is provided on both surfaces of a resin expanded sheet with only an open cell layer. Further, for example, Patent Document 3 discloses a technique in which a flat plate without air permeability and a gel layer are laminated with an air chamber layer (aggregate) having air permeability interposed therebetween. Further, for example, Patent Document 4 discloses a technique in which a non-woven fabric and a crystalline resin film are laminated on both surfaces of an open cell expanded layer.

Further, there is known a technique in which a plurality of air permeable materials having different sound absorbing characteristics are laminated so as to further increase a sound absorption coefficient at a specific frequency. For example, Patent Document 5 discloses a technique in which a first layer without air permeability, a second layer with air permeability, and a third layer with open cells are laminated.

Furthermore, Patent Document 6 discloses a technique in which a hole is formed in a metal foil or a metal thin sheet.

CITATION LIST

Patent Document

Patent Document 1: WO 2006/101142
Patent Document 2: JP 2009-161170 A
Patent Document 3: JP 2010-51629 A
Patent Document 4: JP 2009-120060 A
Patent Document 5: JP 2008-537526 A
Patent Document 6: JP 2006-116671 A

Non-Patent Document

Non-Patent Document 1: Edition of Architectural Institute of Japan, "Onkyou zairyou no tokusei to sentei (Characteristics and selection of acoustical materials)", first edition, first print, Architectural Institute of Japan, Oct. 25, 1997, pages 66 and 67

DISCLOSURE OF THE INVENTION

Technical Problem

As described above, since the sound absorption materials disclosed in Patent Documents 1 to 5 include a material with air permeability such as a foam resin with open cells, there is a case in which the strength or the rigidity may not be sufficiently ensured. Meanwhile, the material without air permeability may easily improve the strength or rigidity compared to the material with air permeability, but does not have sound absorbency.

It is an object of the invention to provide a sound absorption panel which has high strength or rigidity and has sound absorbency.

Solution to Problem

A sound absorption panel of the invention is a sound absorption panel obtained by laminating a foam resin with closed cells and a metal sheet. The sound absorption panel is provided with a plurality of holes which penetrate the foam resin and the metal sheet in the thickness direction. The holes are formed by causing a hole-forming means to penetrate the foam resin and the metal sheet.

In the sound absorption panel, a foam resin with closed cells and a metal sheet are laminated. Thus, compared to a sound absorption material including a foam resin with open cells and a surface sheet, the strength or the rigidity of the sound absorption panel may be improved.

Further, the sound absorption panel is provided with a plurality of holes which penetrate the foam resin with closed cells and the metal sheet in the thickness direction. Thus, sound absorbency may be given to a panel obtained by laminating a foam resin that originally does not have air permeability and sound absorbency and a metal sheet that originally does not have air permeability and sound absorbency.

Effect of the Invention

According to the invention, by laminating the foam resin that originally does not have air permeability and sound absorbency and includes closed cells and the surface sheet that originally does not have air permeability and sound absorbency, the strength or the rigidity of the sound absorption panel can be improved and sound absorbency can be given to the sound absorption panel.

BRIEF DESCRIPTION OF THE DRAWINGS

[FIG. 1]

FIG. 3 is a graph illustrating an experiment result of samples "1-1" to "1-14".

FIG. 4 is a graph illustrating an experiment result of samples "1-10", "2-10", "3-10", and "4-10".

FIG. 5 is a graph illustrating an experiment result of samples "4-3", "4-5", "4-10", "4-12", and "4-14".

[FIG. 6]

DESCRIPTION OF EMBODIMENTS

Figure 1A:
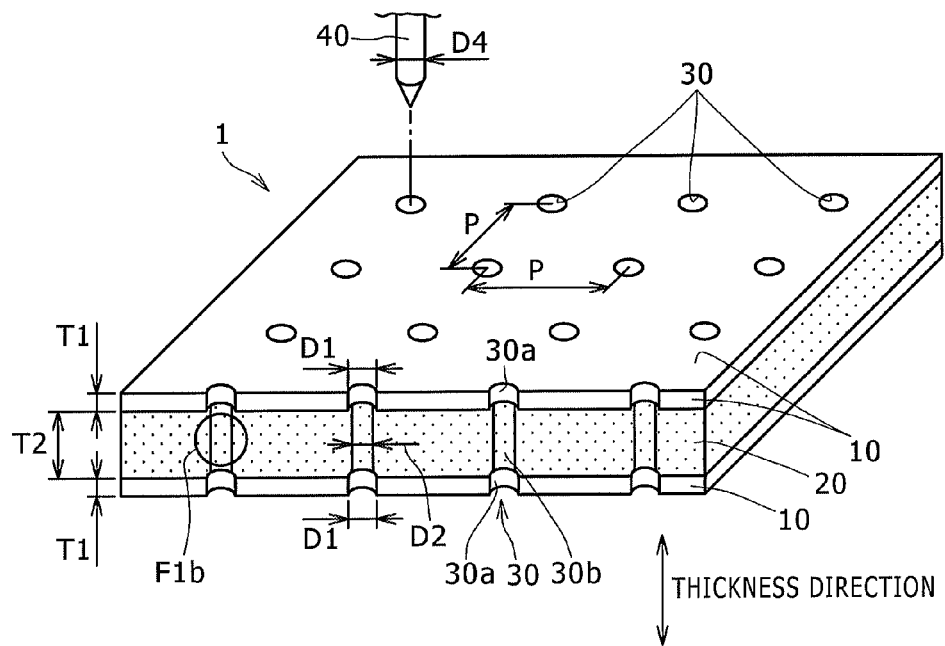
FIG. 1(a) is a schematic perspective view of a sound absorption panel and FIG. 1(b) is an enlarged view of a portion Fib illustrated in FIG. 1(a).
Figure 1B:
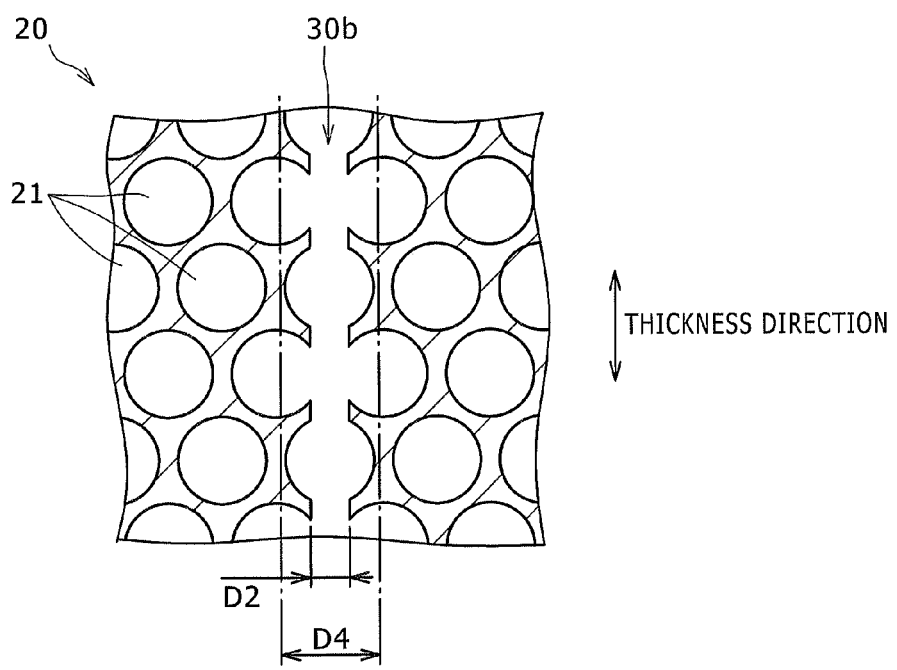

Hereinafter, an embodiment of a sound absorption panel 1 will be described by referring to FIG. 1. Furthermore, FIG. 1(a) is a perspective view schematically illustrating a structure of the sound absorption panel 1. FIG. 1(b) is an enlarged view of a portion F1b illustrated in FIG. 1(a) and is a diagram schematically illustrating a structure of a hole 30b. Furthermore, in order to prevent the drawings from becoming complicated, only a part of holes 30 in the plurality of holes 30 are denoted by letters and numerals in FIG. 1(a), and only a part of cells 21 in the plurality of cells 21 are denoted by letters and numerals in FIG. 1(b).

The sound absorption panel 1 is a plate with sound absorbency. As illustrated in FIG. 1(a), the sound absorption panel 1 is obtained by laminating a foam resin 20 with closed cells and an aluminum alloy sheet (metal sheet) 10. The sound absorption panel 1 is provided with a plurality of holes 30. The hole 30 is formed by a needle 40. The sound absorption panel 1 is appropriate for the usage as a component which requires strength or rigidity and sound absorbency. The sound absorption panel 1 is used as, for example, a sound absorption interior panel or a sound absorption exterior panel as, for example, a vehicle component or a train component. Specifically, in a case where the sound absorption panel 1 is used as the vehicle component, the panel is used as, for example, a sound absorption interior panel such as a ceiling material or a partition plate for a luggage room and a guest room or a sound absorption exterior panel such as an undercover provided at the outside of the vehicle so as to be positioned below a vehicle engine or a floor. In a case where the sound absorption panel 1 is used as the train component, the panel is used as, for example, a sound absorption interior panel such as an interior material like a ceiling material, a wainscot, an inner gable, or an interior floor or a sound absorption exterior panel such as an undercover provided at the outside of the vehicle so as to be positioned below a train floor.

The aluminum alloy sheet 10 is used as a metal sheet (including a metal foil) which originally does not have air permeability and sound absorbency. The aluminum alloy sheet 10 is laminated on both surfaces of the foam resin 20. In other words, the foam resin 20 is nipped between two aluminum alloy sheets 10 and 10. The thickness T1 of the aluminum alloy sheet 10 may be set in response to the strength or the rigidity applied to the sound absorption panel 1, and is set from, for example, the range of 0.05 to 1 mm. The material of the aluminum alloy sheet 10 is, for example, a conditioned material selected from materials O, H22 to H24, H32 to H34, and T4 among the quality symbols specified according to JISH0001. In a case where a curved surface does not need to be formed in a part or the entirety of the sound absorption panel 1, the invention is not limited to the conditioned material. For example, a material such as H39 which has low processability and high strength may be used. Furthermore, the thicknesses T1 and T1 of two aluminum alloy sheets 10 and 10 may be equal to each other or may not be equal to each other. Further, the aluminum alloy sheet 10 may be replaced by, for example, a metal sheet such as iron and steel (iron, carbon steel, alloy steel, or the like) or non-ferrous metal (copper, various kinds of alloys, or the like). Further, metal sheets made of different kinds of materials may be used on both surfaces of the foam resin 20.

The foam resin 20 is a material which includes closed cells and originally does not have air permeability and sound absorbency. The foam resin 20 is of a plate shape. Air does not permeate the foam resin 20 from one surface to the other surface thereof except for the portion of the hole 30b to be described later. Here, as illustrated in FIG. 1(b), "including the closed cells" means that the cells 21 inside the foam resin 20 are not basically connected to one another except for the portion of the hole 30b. As illustrated in FIG. 1(a), the thickness T2 of the expanded foam resin 20 is set in response to the peak frequency for maximizing the sound absorption coefficient or the strength or the rigidity to be applied to the sound absorption panel 1. In a case of using a foam resin which is expanded by heating, the thickness of the non-expanded foam resin 20 (foam resin core) is, for example, 0.5 to 1.4 mm. The expansion ratio of the foam resin 20 is, for example, 2 to 20 times and, for example, 3 to 10 times. The thickness of the expanded foam resin 20 is, for example, 2 to 20 mm and, for example, 4 to 7 mm. Furthermore, the foam resin 20 may be expanded already when the foam resin is laminated on the aluminum alloy sheet 10.

Further, the foam resin 20 is formed as a synthetic resin formed of a polymer material. The resin forming the foam resin 20 is, for example, a polypropylene resin. The polypropylene resin is cheap compared to the other synthetic resins, and has a high elastic coefficient and a certain high degree of a melting point. Furthermore, the resin forming the foam resin 20 may be a polyolefin resin, a polystyrene resin, a polyurethane resin, a polyester resin, or the like. Examples of the polyolefin resin include a polypropylene resin, a polyethylene resin, a polyolefin resin, an EPR, an EPDM, and the like. Examples of the polystyrene resin include a polystyrene resin, a thermoplastic elastomer ABS resin, an AS resin, and the like.

Further, the foam resin 20 is manufactured by expanding a non-expanded resin. The expanding of the resin may be performed by various methods.

For example, there is known a method in which an expanding agent generating a nitrogen gas by heating is added to a resin and the resin is heated to be expanded. Specifically, for example, an expanding agent of 0.1 to 10 parts by weight is added to a polypropylene resin (an expanding agent of 0.1 to 10 g is added to a polypropylene resin of 100 g). Then, when the polypropylene resin containing the expanding agent is heated, the polypropylene resin is expanded 2 to 20 times (volume ratio).

Further, for example, when a gas blows into a non-expanded resin, the resin may be expanded. Further, for example, when a gas such as a carbon gas is melted in a non-expanded resin which is in a low-temperature state and a vacuum state and the resin is opened to the atmospheric pressure at a normal temperature so that the gas becomes bubbles, the resin may be expanded. Further, for example, when carbon dioxide or the like in a supercritical state is mixed with a non-expanded resin and the resin is cooled and depressurized so as to generate fine bubbles, the resin may be expanded.

A plurality of holes 30 are formed in the sound absorption panel 1 and penetrate the foam resin 20 and the aluminum alloy sheet 10 in the thickness direction (the thickness direction of the sound absorption panel 1). The hole 30 enables the passage of air from one surface to the other surface in the panel obtained by laminating the foam resin 20 and the aluminum alloy sheet 10. The arrangement, the pitch (interval) P, the aperture ratio, and the like of the plurality of holes 30 are appropriately set in response to the peak frequency maximizing the sound absorption coefficient. Furthermore, the hole diameter of the hole 30 will be described later.

Further, the hole 30 may be divided into the hole 30a of the aluminum alloy sheet 10 and the hole 30b of the foam resin 20. As illustrated in FIG. 1(b), the hole 30b has the same structure as that of the open cell. The hole 30b has a structure in which a weak (thin) portion of the wall isolating the plurality of cells 21 is mainly broken (cracked) before forming the hole 30b and the plurality of cells 21 are connected to each other. In other words, the inner surface of the hole 30b is formed in a knurl shape (corrugation shape).

Further, sound absorbency is given to the sound absorption panel 1 illustrated in FIG. 1(a) by the hole 30. That is, the air passing through the hole 30 receives a resistance, and vibration energy (that is, sound energy) of air is converted into thermal energy. Hereinafter, such a phenomenon is referred to as "generation of loss". Specifically, for example, loss is generated by the friction between the inner wall of the hole 30 and the air vibrated inside the hole 30. Since the inner surface of the hole 30b in the foam resin 20 has a knurl shape (see FIG. 1(b)), the loss is generated by the friction. Further, for example, the flow speed of the air at the exit of the hole 30 is larger than that of the air at the entrance of the hole due to the hole effect, and a swirl of air is generated around the exit of the hole 30, thereby generating a loss.

Further, the hole 30 is formed by the needle (hole-forming means) 40.

The needle (hole-forming means) 40 is a member (a drill, a perforating punch, a needle, a nail, a protrusion, or the like) that penetrates the foam resin 20 and the aluminum alloy sheet 10 so as to form the hole 30. The plurality of needles 40 are arranged so as to protrude from, for example, a roll (cylindrical member) or a plate. That is, the plurality of needles 40 are arranged like, for example, pin-holder needles. Furthermore, in FIG. 1(a), only one needle 40 is illustrated.

Further, the cross-section (hereinafter, simply referred to as the "cross-section of the needle 40") of the needle 40 when viewed from the axial direction is circular. Furthermore, the cross-section of the needle 40 may be substantially circular (for example, oval, polygonal, or the like).

Further, the needle diameter D4 (the cross-section diameter) of the needle 40 is, for example 0.3 to 5 mm, and desirably, 0.6 to 4 mm. Here, the "cross-section diameter" is defined as below. In a case where the cross-section of the needle 40 is circular, the "cross-section diameter" is set as the diameter of the circle of the cross-section. In a case where the cross-section of the needle 40 is not circular, the "cross-section diameter" is set as the diameter of the circular cross-section having the same cross-sectional area as that of the cross-section. Furthermore, in a case where the hole-forming means is a drill, the "cross-section diameter" is set as the drill diameter (the diameter of the dill when viewed from the axial direction). In the same way, the hole diameter D1 of the hole 30a is defined as below. The hole diameter D1 is set as the diameter of the circular cross-section of the hole 30a when viewed from the thickness direction of the sound absorption panel 1 or the diameter of the circular cross-section having the same cross-sectional area as that of the cross-section. Similarly, the hole diameter D2 of the hole 30b is defined as below. The hole diameter D2 is set as the diameter of the circular cross-section of which the cross-sectional area is narrowest among the cross-sections of the hole 30b when viewed from the thickness direction of the sound absorption panel 1 or the diameter of the circular cross-section having the same cross-sectional area as that of the cross-section.

The hole diameter D1 of the hole 30a is substantially equal to the needle diameter D4 of the needle 40. Meanwhile, the hole diameter D2 of the hole 30b becomes smaller than the needle diameter D4 of the needle 40 (this will be described later in detail).

(Manufacturing Method 1)

A panel (compound forming body) in which the foam resin 20 and the aluminum alloy sheet 10 are laminated and the hole 30 is not formed is manufactured, for example, as below. Furthermore, the panel without the hole 30 is referred to as panel 1' (not illustrated).

For example, a non-expanded resin mixed with an expanding agent and the aluminum alloy sheet 10 are laminated while being bonded to each other through an adhesive or the like. When the laminated material is heated, the resin is expanded, so that the foam resin 20 is formed. Accordingly, the panel 1', and more specifically, the foam resin-metal lamination panel 1' with the expanded foam resin 20 are manufactured.

Further, for example, the panel 1' is manufactured in a manner such that the aluminum alloy sheet 10 is bonded to the expanded foam resin 20 through an adhesive or the like.

The hole 30 is formed by causing the needle 40 to penetrate the foam resin 20 and the aluminum alloy sheet 10 with respect to the panel 1' in which the expanded foam resin 20 and the aluminum alloy sheet 10 are laminated. Specifically, the hole 30 is formed by the needle 40, for example, as below.

For example, the panel 1' passes between two rolls, that is, a first roll (not illustrated) which has the plurality of needles 40 formed on the surface thereof and a second roll (not illustrated) which has recesses formed on the surface thereof so as to correspond to the plurality of needles 40. Then, the plurality of holes 30 are formed in the panel 1' in a manner such that the needles 40 are thrust into the panel 1' while rotating two rolls. Accordingly, the sound absorption panel 1 is supplied.

Further, for example, the plurality of holes 30 are formed in the panel 1' in a manner such that the panel 1' is pressed between two press plates, that is, a first press plate (not illustrated) which has the plurality of needles 40 formed on the surface thereof and a second press plate (not illustrated) which has recesses formed on the surface thereof so as to correspond to the plurality of needles 40. Accordingly, the sound absorption panel 1 is manufactured.

(Manufacturing Method 2)

The sound absorption panel 1 may be manufactured as below. The hole 30 is formed as described above with respect to a non-expanded resin-metal lamination panel 1" (not illustrated) in which the non-expanded foam resin 20 and the aluminum alloy sheet 10 are laminated. Accordingly, a non-expanded resin-metal lamination panel 1''' with a hole (not illustrated) is manufactured. Next, the foam resin 20 is expanded by heating the non-expanded resin-metal lamination panel 1'''. Accordingly, the sound absorption panel 1 is manufactured. In this method, when a needle having a needle diameter D4 which is equal to or larger than 0.6 mm is used, the hole 30b is not blocked while expanding the foam resin 20.

(Curved Surface Processing and the Like)

A part or the entirety of the sound absorption panel 1 is processed into a curved surface or is a flat surface. Further specifically, the flat sound absorption panel 1 which is manufactured by a "manufacturing method 1" or a "manufacturing method 2" may be used in a flat state.

Further, a part or the entirety of the flat sound absorption panel 1 may be processed into a curved surface. In a case where the sound absorption panel 1 is processed into a curved surface, a curved surface is processed by pressing a part or the entirety of the sound absorption panel 1, the panel 1', the foam resin-metal lamination panel 1" (not illustrated), or the non-expanded resin-metal lamination panel 1''' (not illustrated).

In a case where the foam resin-metal lamination panel 1' or the non-expanded resin-metal lamination panel 1" is processed into a curved surface, the hole 30 and the curved surface may be simultaneously formed by using, for example, press plates with desired curved surfaces as the first press plate (not illustrated) and the second press plate (not illustrated).

Further, it is desirable to form the curved surface by pressing with respect to the non-expanded resin-metal lamination panel 1". Specifically, the pressing workability of the sound absorption panel 1 or the foam resin-metal lamination panel 1' including the expanded foam resin 20 is lower than that of the non-expanded resin-metal lamination panel 1". Furthermore, the pressing workability of the lamination panel with the hole 30 is much lower than that of the lamination panel without the hole 30. Thus, in a case where the deeper curved surface needs to be processed, the non-expanded resin-metal lamination panel 1" is processed into a curved surface by pressing, and the hole 30 is formed by the first and second press plates each of which has a curved surface as that of the pressing and the plurality of needles 40, thereby forming a non-expanded resin-metal porous lamination panel 1''' (not illustrated). Alternatively, in such a case, it is desirable to simultaneously perform pressing and forming of the hole 30 as described above. Subsequently, the result is heated and expanded, thereby obtaining the sound absorption panel 1.

(Experiment)

The normal incident sound absorption coefficient (hereinafter, simply referred to as a "sound absorption coefficient") of the sound absorption panel 1 is examined with respect to twenty one kinds of samples. The experiment was performed based on JIS A 1405-2. The thickness of the back air layer is 20 mm. The pitch P of the hole 30 is 10 mm. The pitch P of the hole 30 indicates the gap between the center of the certain hole 30 and the center of the hole 30 adjacent to the corresponding hole 30. Table 1 illustrates the thickness ("surface aluminum thickness (mm)" for one aluminum alloy sheet 10, the expansion ratio (times) of the closed cell foam resin 20, and the thickness (mm) of the closed cell foam resin 20 with respect to each sample. Table 2 illustrates the needle diameter D4 (mm) of the needle 40 with respect to each sample. The hole 30 is formed in a manner such that the needle 40 penetrates the panel 1' in which the expanded foam resin 20 and two aluminum alloy sheets 10 and 10 are laminated.

TABLE 1

| SAMPLE No. | SURFACE ALUMINUM THICKNESS (mm) | CLOSED CELL FOAM RESIN | |
|---|---|---|---|
| | | EXPANSION RATIO (TIMES) | THICKNESS mm |
| 1-1 to 1-14 | 0.15 | 4.0 | 4.0 |
| 2-10 | 0.3 | 3.0 | 3.0 |
| 3-10 | 0.15 | 3.6 | 3.6 |
| 4-3, 5, 10, 12, 14 | 0.3 | 7.0 | 7.0 |

TABLE 2

| | NEEDLE DIAMETER (mm) | | | | | | | | | | | | | |
|---|---|---|---|---|---|---|---|---|---|---|---|---|---|---|
| | 0.3 | 0.5 | 0.6 | 0.8 | 1.0 | 1.2 | 1.4 | 1.6 | 1.8 | 2.0 | 2.5 | 3.0 | 3.5 | 4.0 |
| SAMPLE No. | 1-1 | 1-2 | 1-3 | 1-4 | 1-5 | 1-6 | 1-7 | 1-8 | 1-9 | 1-10 2-10 3-10 | 1-11 | 1-12 | 1-13 | 1-14 |
| | | | 4-3 | | 4-5 | | | | | 4-10 | | 4-12 | | 4-14 |

FIGS. 3 to 5 illustrate graphs representing a relation between the frequency (Hz) and the normal incident sound absorption coefficient. FIG. 3 illustrates an experiment result of samples "1-1" to "1-14", FIG. 4 illustrates an experiment result of samples "1-10", "2-10", "3-10", and "4-10", and FIG. 5 illustrates an experiment result of samples "4-3", "4-5", "4-10", "4-12", and "4-14" (hereinafter, see FIG. 1 with respect to the above-described components).

FIG. 3 illustrates an experiment result of samples "1-1" to "1-14" of the sound absorption panel 1. First, the panel 1' is manufactured in a manner such that the aluminum alloy sheet 10 of the thickness T1 is laminated on both surfaces of the foam resin 20 which has the thickness T2 and is expanded four times. Then, the sound absorption panel 1 is manufactured in a manner such that the hole 30 is formed in the panel 1' at the pitch P using the needle 40 of the needle diameter D4 (illustrated in Table 2). FIG. 3 illustrates a result obtained by measuring the normal incident sound absorption coefficients of samples "1-1" to "1-14" of the sound absorption panel 1. Here, the thickness T2 is 4 mm, the thickness T1 is 0.15 mm, the needle diameter D4 is in the range of 0.3 to 4.0 mm, and the pitch P is 10 mm.

From this result, the followings (1) to (11) may be understood.

(1) The peak frequency maximizing the sound absorption coefficient changes in response to a change in the needle diameter D4.

(2) In general, the peak frequency increases as the needle diameter D4 increases.

(3) The magnitude of the sound absorption coefficient at the peak frequency changes in response to a change in the needle diameter D4.

(4) In a case where the needle diameter D4 is 0.3 mm (sample "1-1") and 0.5 mm (sample "1-2"), the sound absorption coefficient is only 0.1 in the entire frequency.

(5) In the needle diameter D4 of 0.6 mm to 4.0 mm (samples "1-3" to "1-14"), the maximum value of the sound absorption coefficient exceeds 0.4.

(6) In the needle diameter D4 of 0.8 mm to 3.5 mm (samples "1-4" to "1-13"), the maximum value of the sound absorption coefficient exceeds 0.5.

(7) In the needle diameter D4 of 1.0 mm to 3.0 mm (samples "1-5" to "1-12"), the maximum value of the sound absorption coefficient exceeds about 0.68.

(8) In the needle diameter D4 of 1.2 mm to 2.5 mm (samples "1-6" to "1-11"), the maximum value of the sound absorption coefficient exceeds about 0.79.

(9) In the needle diameter D4 of 1.4 mm to 2.5 mm (samples "1-7" to "1-11"), the maximum value of the sound absorption coefficient exceeds about 0.88.

(10) The sound absorption coefficient becomes maximal when the needle diameter D4 is 1.8 mm and 2 mm (samples "1-9" and "1-10"), and the maximum value of the sound absorption coefficient was a satisfactory value as 1.0.

(11) Although no experiment was performed, when the needle diameter D4 exceeds 4 mm, the maximum value of the sound absorption coefficient becomes less than 0.4 according to the expectation from FIG. 3, and hence there is a possibility that the satisfactory sound absorption coefficient may not be obtained.

Figure 7:
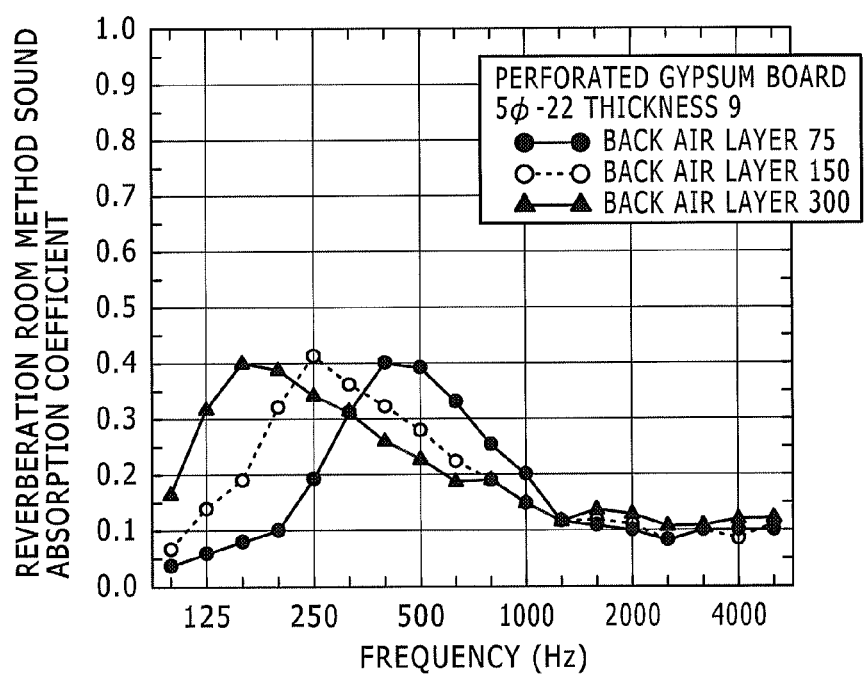
FIG. 7 is a graph illustrating a reverberation room method sound absorption coefficient of a perforated gypsum board (related art).

Furthermore, FIG. 7 illustrates a reverberation room method sound absorption coefficient of a board with a hole of a diameter of 5 mm in a single material (gypsum board) instead of a lamination plate (see p. 79 of Non-Patent Document 1). In this board, the maximum value of the sound absorption coefficient is about 0.4 or less.

Next, FIG. 4 illustrates an experiment result of samples "1-10", "2-10", "3-10", and "4-10". In these samples, the needle diameter D4 is fixed to 2 mm, and the pitch P of the hole 30 is fixed to 10 mm. However, the thickness T1 of the aluminum alloy sheet 10 and the expansion ratio and the thickness T2 of the foam resin 20 are respectively different (these are illustrated in Table 1). FIG. 4 illustrates a measurement result of the normal incident sound absorption coefficients of these samples of the sound absorption panel 1. From this result, the maximum value of the sound absorption coefficient and the peak frequency are respectively different between the samples, but it is understood that the maximum value of the sound absorption coefficient of each sample is a satisfactory value of 0.8 to 1.0. More specifically, the maximum value of the sound absorption coefficient of sample "2-10" was about 0.8. The maximum value of the sound absorption coefficient of sample "3-10" was about 0.95. The maximum values of the sound absorption coefficients of samples "1-10" and "4-10" were about 1.0.

Further, FIG. 5 illustrates an experiment result of samples "4-3", "4-5", "4-10", "4-12", and "4-14". First, the panel 1' is manufactured by laminating the aluminum alloy sheet 10 of the thickness T1 on both surfaces of the foam resin 20 with the expansion ratio of 7 times and the thickness T2. Then, the sound absorption panel 1 is manufactured by forming the hole 30 using the needle 40 of the needle diameter D4 (illustrated in Table 2). FIG. 5 illustrates a measurement result of the normal incident sound absorption coefficients of samples "4-3", "4-5", "4-10", "4-12", and "4-14" of the sound absorption panel 1. Here, the thickness T2 is 7 mm (thicker than the other samples), the thickness T1 is 0.3 mm, and the needle diameter D4 is in the range of 0.6 to 4.0 mm. From this result, the followings (1) to (5) may be understood.

(1) In samples "4-3", "4-5", "4-10", "4-12", and "4-14", the maximum value of the sound absorption coefficient and the peak frequency are different from samples "1-1" to "1-14" illustrated in FIG. 3, but there is the same tendency (the peak frequency and the maximum value of the sound absorption coefficient change with a change in the needle diameter D4).

(2) In samples "4-3", "4-5", "4-10", "4-12", and "4-14", the maximum values of the sound absorption coefficients were satisfactory values of 0.6 or more. Among these, the sound absorption coefficient becomes maximal (about 1.0) in the needle diameter D4 of 2 mm (sample "4-10").

(3) In the needle diameter D4 of 1.0 mm (sample "4-5"), the maximum value of the sound absorption coefficient was about 0.6.

(4) In the needle diameter D4 of 3 mm (sample "4-12"), the maximum value of the sound absorption coefficient exceeded about 0.7.

(5) In the needle diameter D4 of 4 mm (sample "4-14"), the maximum value of the sound absorption coefficient at 1400 Hz or less exceeded about 0.55.

(Effect 1)

As illustrated in FIG. 1(a), the sound absorption panel 1 is manufactured by laminating the foam resin 20 including closed cells and the aluminum alloy sheet 10 (the metal sheet). Thus, compared to the sound absorption material with the surface sheet and the foam resin of the open cell, the strength or the rigidity of the sound absorption panel 1 may be improved. As a result, the sound absorption panel 1 may be easily used as, for example, a structure such as a partitioning wall.

Further, the sound absorption panel 1 is provided with the plurality of holes 30 penetrating the foam resin 20 including closed cells and the aluminum alloy sheet 10. Thus, sound absorbency may be given to the panel 1' (not illustrated) obtained by laminating the foam resin 20 that originally does not have air permeability and sound absorbency and includes closed cells and the aluminum alloy sheet 10 that originally does not have air permeability and sound absorbency.

(Effect 2)

Further, the hole 30 of the sound absorption panel 1 is formed by causing the needle 40 (the hole-forming means) to penetrate the foam resin 20 and the aluminum alloy sheet 10. Here, the needle diameter D4 (the cross-section diameter) of the needle 40 is 0.6 to 4 mm. When the needle diameter D4 is 0.6 to 4 mm, sound absorbency may be easily obtained compared to the case where the needle diameter D4 is other than 0.6 to 4 mm.

More specifically, when the needle diameter D4 of the needle 40 exceeds 4 mm, the resistance of the air passing through the hole 30 is small (the viscosity of the air is small) compared to the case where the needle diameter D4 is equal to or smaller than 4 mm and hence the sufficient sound absorbency may not be obtained.

Figure 2:
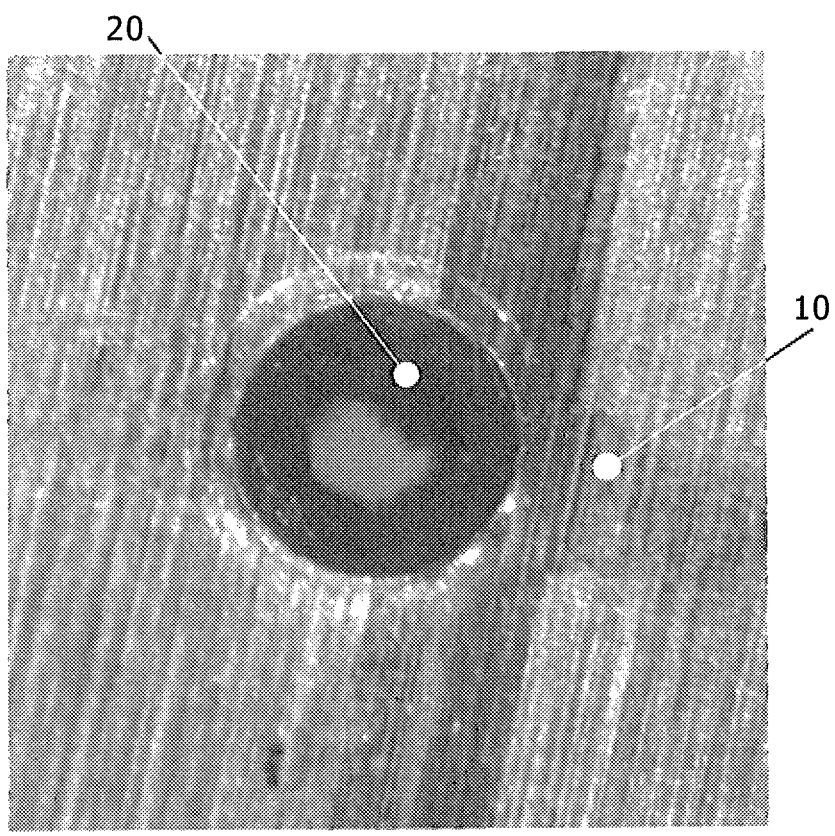
FIG. 2 is a diagram based on a photograph in which a hole diameter of a foam resin is smaller than a hole diameter of an aluminum alloy sheet.
Figure 6A:
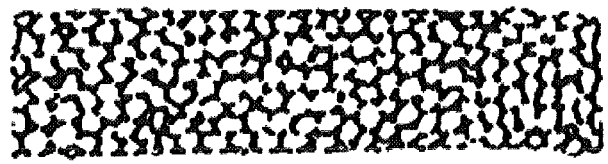
FIG. 6(a) is a diagram illustrating a foam resin with open cells and FIG. 6(b) is a diagram illustrating a foam resin with closed cells.
Figure 6B:
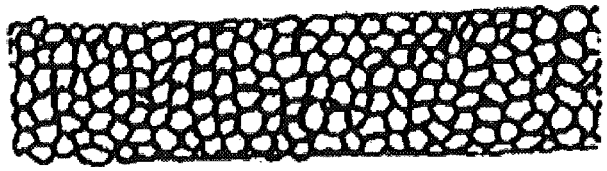

Further, the reason why the sound absorbency may not be sufficiently obtained when the needle diameter D4 of the needle 40 is less than 0.6 mm will be described. First, the paragraph "0029" of Patent Document 6 discloses that the sound absorbency becomes excellent as the size of the hole formed in the metal material decreases and the maximum length (the needle diameter D4) of the width of the tip of the protrusion is desirably equal to or smaller than 0.3 mm. Based on the technique described in the document, a case is supposed in which the hole 30 is formed in the panel 1' obtained by laminating the aluminum alloy sheet 10 and the foam resin 20 using the needle 40 of which the needle diameter D4 is 0.3 mm. However, even when the hole 30 is formed by the needle 40 of which the needle diameter D4 is less than 0.6 mm, sufficiently large sound absorbency may not be given to the panel 1'. The reason is as below. When the needle 40 is thrust into the foam resin 20, a weak portion of a wall isolating the plurality of cells 21 (see FIG. 1(b)) is mainly broken. At this time, the vicinity of the broken portion is elastically deformed in a direction in which the needle 40 is thrust (the down direction in FIG. 1(a)) or outward in the radial direction of the needle 40. Then, when the needle 40 is taken out of the foam resin 20, the elastically deformed portion of the foam resin 20 returns to the original state. Then, as illustrated in FIG. 1(b), the hole diameter D2 of the hole 30b becomes smaller than the needle diameter D4 of the needle 40. As a result, when the hole 30 is formed by the needle 40 of which the needle diameter D4 is smaller than 0.6 mm, there is a case in which the air permeability of the hole 30b is not sufficiently ensured, and hence the sound absorbency is not sufficient. Furthermore, the photograph of FIG. 2 illustrates a state where the hole diameter D2 of the foam resin 20 is smaller than the hole diameter D1 of the aluminum alloy sheet 10.

Further, since the needle diameter D4 of the needle 40 (the cross-section diameter) forming the hole 30 of the sound absorption panel 1 is equal to or larger than 0.6 mm, it is possible to suppress degradation in the yieldability or manufacturing cost of the sound absorption panel 1. More specifically, the tip of the needle 40 becomes round since the tip decreases in size due to the abrasion in use. The needle 40 having a round tip may be easily curved and bent when being thrust into the panel 1'. When the needle 40 is curved or bent, there is a need to replace the needle 40. As a result, the yieldability of the sound absorption panel 1 is degraded, and hence a problem arises in that the manufacturing cost increases. Meanwhile, when the needle diameter D4 of the needle 40 is equal to or larger than 0.6 mm, the strength of the needle 40 may be increased compared to the case where the needle diameter D4 is smaller than 0.6 mm. That is, when the needle diameter D4 is equal to or larger than 0.6 mm, the needle 40 may not be easily curved and bent, and hence the above-described problem may be suppressed.

(Effect 3)

Further, in the sound absorption panel 1, the expansion ratio of the foam resin 20 is 2 to 20 times. Thus, the sound absorption panel 1 has strength or rigidity and is light in weight. When the expansion ratio of the foam resin 20 becomes less than 2 times, there is a possibility that the sound absorption panel 1 is not light in weight compared to the aluminum alloy sheet 10 having the same bending rigidity or bending strength. Further, when the expansion ratio of the foam resin 20 becomes 20 times or more, there is a possibility that the bending rigidity and the bending strength may be not be sufficiently ensured.

(Effect 4)

Further, in the sound absorption panel 1, the thickness T2 of the expanded foam resin 20 is 2 to 20 mm. In this case, the sound absorbency of the sound absorption panel 1 may be improved compared to the case where the thickness T2 is smaller than 2 mm. Further, in this case, the space which is occupied by the sound absorption panel 1 may be decreased compared to the case where the thickness T2 exceeds 20 mm.

(Effect 5)

Further, in the sound absorption panel 1, the "metal sheet" is the aluminum alloy sheet 10. Thus, the heat ray (far-infrared ray) emitted from the heat source at the outside of the sound absorption panel 1 may be reflected by the aluminum alloy sheet 10. Thus, it is possible to suppress the temperature of the foam resin 20 from becoming equal to or higher than the melting point and hence to suppress the foam resin 20 from being melted by heat. As a result, it is possible to improve the heat resistance of the sound absorption panel 1.

The sound absorption panel 1 may be disposed between, for example, a heat source generating noise and electronic equipment. That is, the sound absorption panel 1 may be used as a heat insulator with sound absorbency. The "heat source generating noise" is, for example, an exhaust pipe or an engine room of a vehicle. The "electronic equipment" is, for example, an inverter of a hybrid vehicle, a fuel injecting device of an engine, other electronic equipment, or a cable.

(Effect 6)

Further, the same effect is obtained even with the sound absorption panel 1 of which a part or the entirety is processed into a curved surface or with the flat sound absorption panel 1 which is flat.

(Other Effects)

When the hole 30b is formed in the non-expanded resin and the resin is expanded, there is a case in which the hole 30b is blocked while the foam resin 20 is expanded. However, when the hole 30b is formed by causing the needle 40 to penetrate the expanded foam resin 20 as in the sound absorption panel 1, the hole 30b is not blocked while the foam resin 20 is expanded. Here, in a case where the needle 40 of which the diameter is equal to or larger than 0.6 mm is used, even when the resin is expanded by heat after forming the hole 30b by causing the needle 40 to penetrate the non-expanded resin, the sound absorption panel 1 may be obtained without blocking the hole 30b while the foam resin 20 is expanded.

Further, in the sound absorption panel 1, the hole 30 is formed while laminating the expanded foam resin 20 and the aluminum alloy sheet 10. That is, the hole 30a and the hole 30b are not separately formed. Thus, it is possible to easily form the hole 30 in which the hole 30b formed in the foam resin 20 communicates with the hole 30a formed in the aluminum alloy sheet 10.

(Modified Example)

In the above-described embodiment, the aluminum alloy sheet 10 may be one sheet. In this case, the sound absorption panel 1 may be disposed so that the aluminum alloy sheet 10 is disposed at the sound source side and the foam resin 20 is disposed at the sound source side. Furthermore, in a case where the sound absorption panel 1 is disposed so that the foam resin 20 is disposed at the sound source side, the sound absorption peak frequency increases.

Further, the hole 30a and the hole 30b may be separately formed while the foam resin 20 and the aluminum alloy sheet 10 are not laminated. In this case, for example, when the aluminum alloy sheet 10 and the foam resin 20 are bonded to each other while a positioning means (a needle-like member, a bar-like member, or the like) penetrates the hole 30a and the hole 30b which are formed to be separated from each other, the hole 30 in which the hole 30a communicates with the hole 30b may be formed.

While the embodiment and the example of the invention have been described, the invention is not limited to the above-described embodiment, and various modifications may be made within the scope of claims. This application claims benefit of Japanese Patent Application (Japanese Patent Application No. 2011-030307) filed on Feb. 15, 2011, which is hereby incorporated by reference.

REFERENCE NUMERALS 1 sound absorption panel
10 aluminum alloy sheet (metal sheet)
20 foam resin
30, 30a, 30b hole
40 needle (hole-forming means)
D4 needle diameter (cross-section diameter)
T2 thickness of foam resin

The invention claimed is:
1. A sound absorption panel which is obtained by laminating a foam resin with first and second metal sheets on a top and bottom surface of the foam resin, respectively, and forming closed cells in the foam resin, wherein a plurality of holes are formed so as to penetrate through the foam resin and the first and second metal sheets in a thickness direction.

2. The sound absorption panel according to claim 1, wherein
the holes are formed by causing a hole-forming means to penetrate the foam resin and the metal sheet, and
a cross-section diameter of the holes is substantially equal to or larger than 0.6 mm and equal to or smaller than 4 mm.

3. The sound absorption panel according to claim 1, wherein an expansion ratio of the foam resin is equal to or larger than 2 times and equal to or smaller than 20 times.

4. The sound absorption panel according to claim 1, wherein the thickness of the foam resin is equal to or larger than 2 mm and equal to or smaller than 20 mm.

5. The sound absorption panel according to claim 1, wherein the first and second metal sheets are aluminum alloy sheets.

6. The sound absorption panel according to claim 1, wherein a part or the entirety of the panel is processed into a curved surface or is flat.

7. The sound absorption panel according to claim 1, wherein a wall portion of each of the plurality of holes through the foam resin are knurl shaped so as to absorb sound passing therethrough.

* * * * *